United States Patent [19]
Robak et al.

[11] Patent Number: 5,181,771
[45] Date of Patent: Jan. 26, 1993

[54] TRIPLE SPRING TORQUE MOTOR

[75] Inventors: Edward Robak, Orange; Carter K. Reh, Santa Ana, both of Calif.

[73] Assignee: Sony Trans Com Inc., Irvine, Calif.

[21] Appl. No.: 662,738

[22] Filed: Mar. 1, 1991

[51] Int. Cl.$^5$ .............................................. A47B 81/06
[52] U.S. Cl. ..................................... 312/7.2; 312/248; 312/319.2; 248/317; 185/40 R; 74/89.15
[58] Field of Search ...................... 312/7.2, 21, 26, 30, 312/242, 248, 319.2; 248/317, 324; 244/118.5; 296/37.7, 37.8; 185/37, 39, 40 R, 45; 74/89.15

[56] References Cited

U.S. PATENT DOCUMENTS

| | | | |
|---|---|---|---|
| 3,503,268 | 3/1970 | Andrews | 185/37 |
| 4,684,164 | 8/1987 | Durham | 296/37.7 |
| 4,713,508 | 12/1987 | Baginski et al. | 185/45 X |
| 4,941,718 | 7/1990 | Alexander, III et al. | 312/312 |
| 5,053,685 | 10/1991 | Bacchi | 74/89.15 |
| 5,096,271 | 3/1992 | Portman | 312/7.2 |

*Primary Examiner*—Kenneth J. Dorner
*Assistant Examiner*—Brian K. Green
*Attorney, Agent, or Firm*—Blakely Sokoloff Taylor & Zafman

[57] ABSTRACT

A display unit that can retract heavy monitors into a stowing cavity when the retracting actuator of the unit becomes inoperative. The display unit has a spring motor with at least two nested torsional springs attached in parallel to provide the torque necessary to retract the monitor. The monitor is connected to a frame such that the monitor can move from a first stowed position to a second viewing position. Attached to the frame and monitor is an actuator typically of the ball screw variety, that rotates the monitor into the two position described. The monitor moves into the viewing position when the ball screw is rotated in a first direction, the monitor further being lifted into the stowed position when the ball screw is rotated into a second opposite direction. The actuator is typically driven by an electric motor adapted to rotate the ball screw in both directions. The spring motor is connected to the actuator, such that the springs turn a predetermined number of turns in a first direction when the monitor is moved from the stowed to the viewing positions. Once turned the springs store potential energy that can be used to lift the monitor back into the stowed position. If the electric motor fails, or if there is a loss of power, the springs turn in a second opposite direction rotating the ball screw and moving the monitor from the viewing to the stowed position.

25 Claims, 4 Drawing Sheets 5,181,771

TRIPLE SPRING TORQUE MOTOR

BACKGROUND OF THE INVENTION

1. Field of the Invention

The present invention relates to video display units that can stow and display a monitor.

2. Description of Related Art

To provide added comfort to passengers in an aircraft, the plane is typically provided with television monitors that display movies, etc. The monitors are usually stowed in a cavity in the ceiling of the passenger compartment. The monitors are typically attached to a hinge that allows the monitors to be rotated down into a viewing position. An actuator and a corresponding electric motor are attached to each monitor to rotate the same in and out of the compartment cavity. On occasion the passenger compartment will lose electrical power, in which case it is desirable to retract the monitors into the stowed position. The Federal Aviation Administration (FAA) requires that all monitors be concealed when the compartment loses power, to insure passenger safety.

Present display units have a single band, clock windup type tension spring connected to a ball screw actuator that rotates the monitor into and out of the cavity. The tension spring stores energy when the monitor is rotated into the viewing position and retracts the monitor when the actuator loses power. To lift heavier monitors such as a 16 inch screen, a heavier spring is required to provide the additional torque needed to lift the monitor. The torque of a spring is typically increased by increasing the diameter of the wire. Although the spring constant is increased, the life of the spring decreases because of the higher stress on the wire. Generally speaking the spring constant of a spring is increased by using a thicker wire, the larger wire diameter also increases the stress of the spring producing a dilemma typically encountered in spring design. What is needed is a device with a long life expectancy, that can retract large monitors into a stowing cavity when the actuator becomes inoperative.

SUMMARY OF THE INVENTION

The present invention is a display unit that can retract heavy monitors into a stowing cavity when the retracting actuator of the unit becomes inoperative. The display unit has a spring motor with at least two nested torsional springs attached in parallel to provide the torque necessary to retract the monitor. The monitor is connected to a frame such that the monitor can move from a first stowed position to a second viewing position. Attached to the frame and monitor is an actuator typically of the ball screw variety, that rotates the monitor into the two position described. The monitor moves into the viewing position when the ball screw is rotated in a first direction, the monitor further being lifted into the stowed position when the ball screw is rotated into a second opposite direction. The actuator is typically driven by an electric motor adapted to rotate the ball screw in both directions.

The spring motor is connected to the actuator, such that the springs turn a predetermined number of turns in a first direction when the monitor is moved from the stowed to the viewing positions. Once turned, the springs store potential energy that can be used to lift the monitor back into the stowed position. If the electric motor fails, or if there is a loss of power, the springs turn in a second opposite direction, rotating the ball screw and moving the monitor from the viewing to the stowed position. By nesting the springs in parallel the spring constant is increased without increasing the wire thickness and the stress of the springs. By the combinatin of these elements, a spring motor is created that has a high torque output, long life expectancy and is compact enough to install in the passenger compartment of an airplane.

Therefore it is an object of this invention to provide a display unit with a purely mechanical device that can retract a heavy monitor into a stowing cavity.

It is also an object of this invention to provide a display unit that can retract a heavy monitor, in the event the monitor retraction actuator becomes inoperative.

It is also an object of this invention to provide a spring motor that has a high torque output, long life expectancy and is compact enough to install in the passenger compartment of an airplane.

BRIEF DESCRIPTION OF THE DRAWING

The objects and advantages of the present invention will become more readily apparent to those skilled in the art after reviewing the following detailed description and the accompanying drawings, wherein.

DETAILED DESCRIPTION OF THE INVENTION

Figure 1:
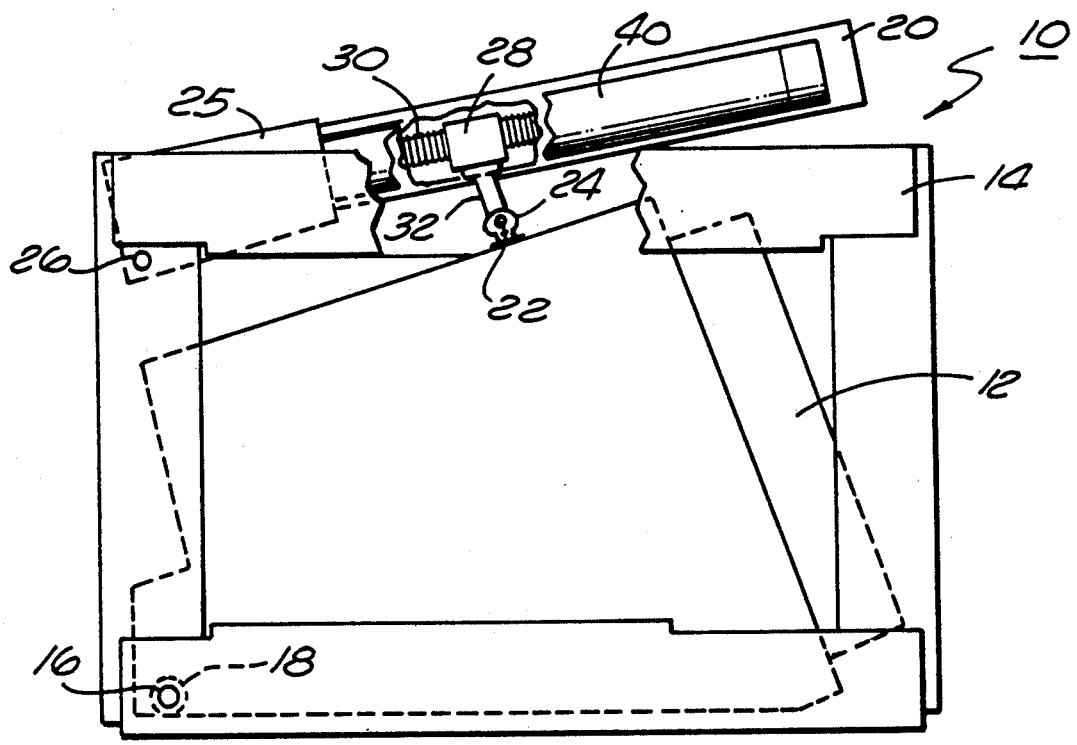
FIG. 1 is a side view of a display unit of the present invention showing a monitor in a stowed position.
Figure 2:
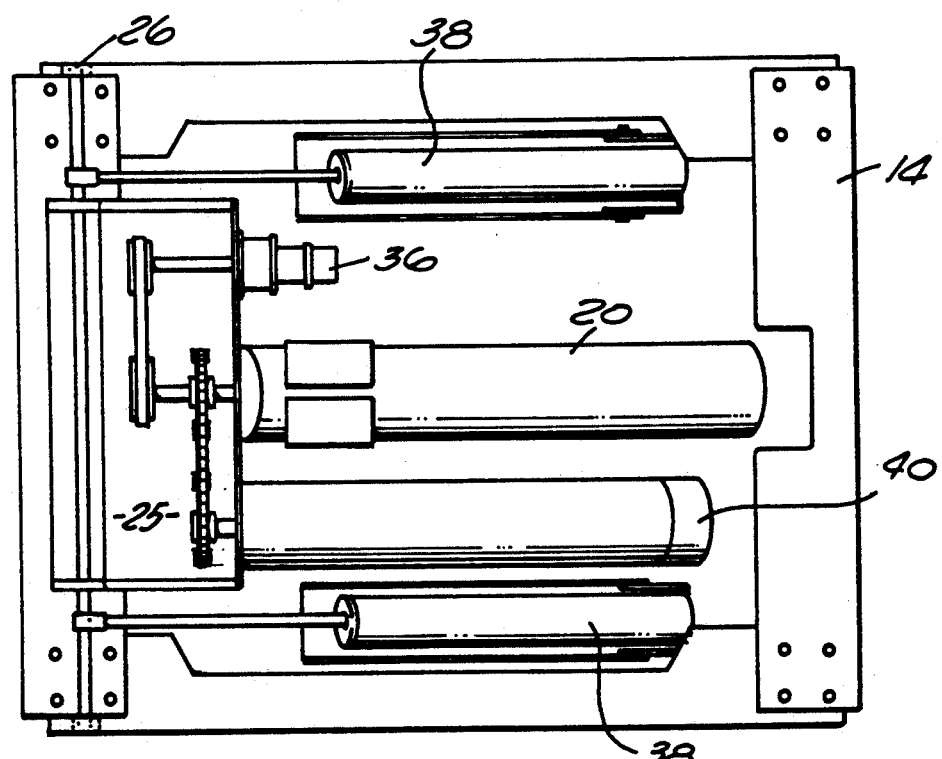
FIG. 2 is a top view of FIG. 1, showing an actuator and a spring motor attached to the monitor along with a pair of air shocks.
Figure 3:
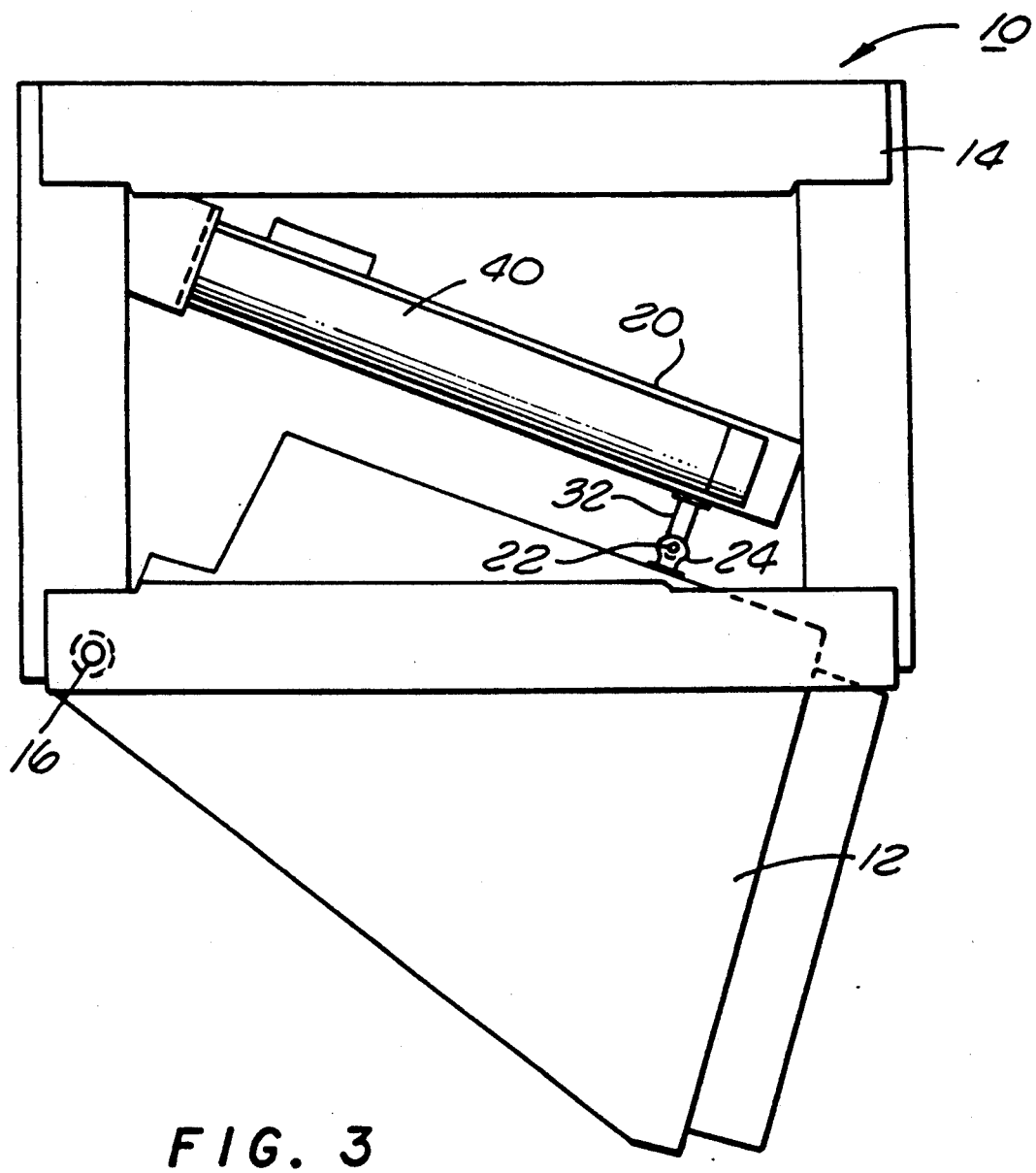
FIG. 3 is a side view similar to FIG. 1, showing the monitor rotated into a viewing position.

Referring to the drawings more particularly by reference numbers, number 10 in FIGS. 1 and 2 is a display unit 10 that moves a monitor 12 from a first stowed position to a second viewing position. The unit 10 has a frame 14 that can be integrated into an overhead compartment 13 in the ceiling of the passenger compartment 15 of an airplane. More particularly the frame 14 can be installed into the oxygen bin above the passenger seats. When retracted into the second position the monitor 12 is suspended above the passengers to allow easy viewing thereof. Although installation of the display unit in an airplane has been discussed, it is understood that the display unit 10 can be used in other structures or vehicles such as a train. The monitor 12 is typically a television, but again the monitor can be any device that is exposed and concealed. The monitor 12 can be pivotally attached to the frame 14 with a first pin 16 that extends through bushings in the monitor 12 and are fixed to the frame 14, wherein the monitor 12 rotates about the first pin 16. The unit 10 has an actuator 20 with one end pivotally attached to the monitor 12 by a second pin 22 and bushings 24, to allow the monitor 12 and actuator 20 to rotate relative to each other. The other end of the actuator 20 is attached to a swivel housing 25, that is pivotally attached to the frame 14 by a third pin 26 that is fixed to the frame 14. The actuator 20 has a nut 28 attached to a ball screw 30 that extends along the longitudinal axis of the actuator 20. The nut 28 has a flange 32 with a bore (not shown) that receives the third pin 26, connecting the ball screw 30 to the monitor 12. The actuator 20 is driven by an electric motor 36 that applies a torque to the ball screw 30, rotating the screw and moving the nut 28 and the monitor 12. Typically, the electric motor 36 can rotate the ball screw 30 in either a clockwise or counterclockwise direction. When the electric motor 36 rotates the ball screw 30 in a first direction, the nut 28 translates along the longitudinal axis of the actuator 20, causing the monitor 12 to rotate about the first pin 16 into the second position as shown in FIG. 3. Because the actuator 20 is connected to the monitor 12 and pivotally attached to the frame 14, it also rotates with the monitor 12 about the second pin 22 as shown. Air shocks 38 can be pivotably attached to the second pin 22, to control the speed of the monitor 12 as it descends from the frame 14, such that the monitor 12 retracts at a slow enough speed that a passenger beneath the unit 10 can see the monitor 12 falling. Also attached to the frame 14 and monitor 12 is a spring motor 40. The spring motor 40 is attached to the swivel housing 25 such that the spring motor 40 can rotate about the frame 14 when the monitor 12 changes position.

Figure 4:
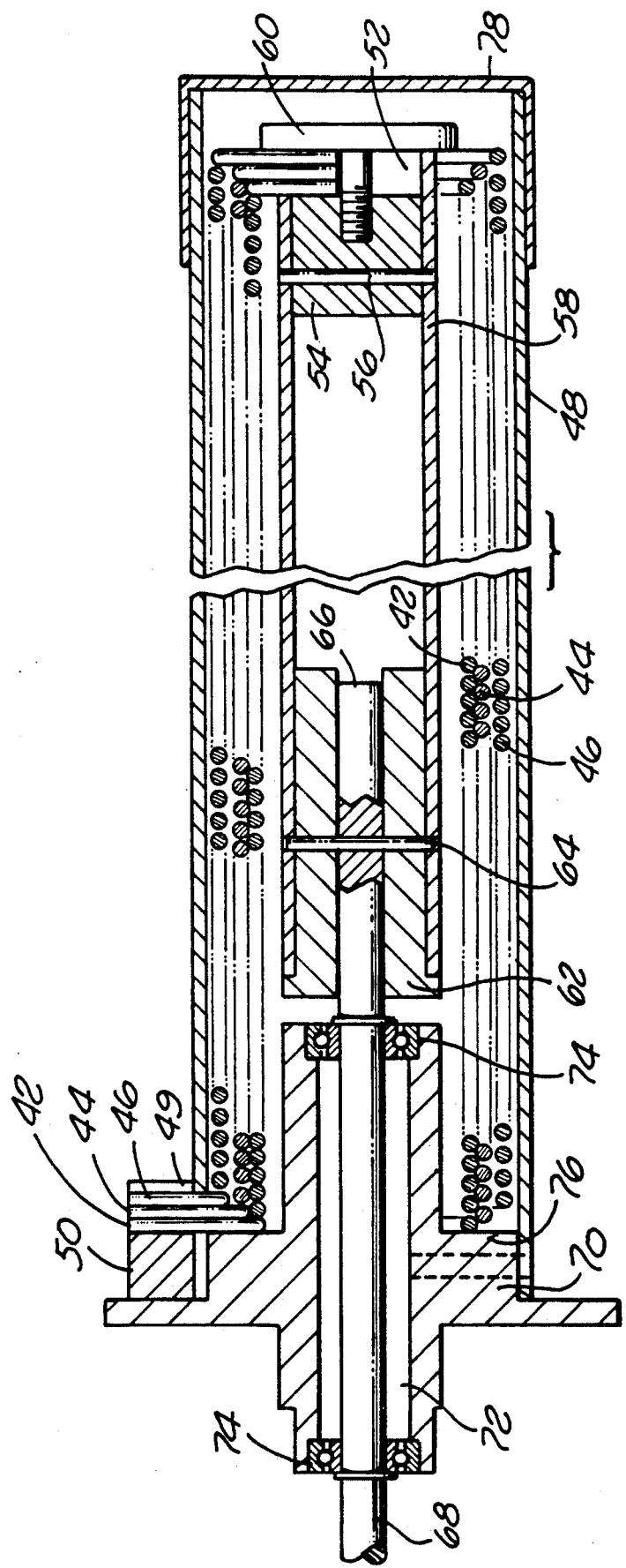
FIG. 4 is a cross-sectional view of the spring motor, showing three nested torsional springs attached in parallel to the output shaft of the motor.

FIG. 4 shows a preferred embodiment of the spring motor 40, which has first 42, second 44 and third 46 torsional springs within a motor housing 48. The first spring 42 has an outer diameter smaller than the inner diameter of the second spring 44, and the outer diameter of the second spring 44 is smaller than the inner diameter of the third spring 46 such that the springs can be nested within each other. One end of the springs is extended through an opening in the housing 48 and fastened into the slot 49 of a spring bracket 50 mounted on the outside of the housing 48. The bracket 50 securely attaches the tab ends of the springs thereof. The opposite tab ends of the springs are inserted into a slot 52 in an end plate 54, that is connected by a fourth pin 56 to a torque tube 58 which extends the length of the motor 40. The spring tab ends are fastened and held in place by end cap 60 that screws into the end plate 54 as shown. The slotted spring tab end holding arrangement provides an advantage not heretofore seen in the art. When torsional springs have been used in the past, it had been found that the majority of spring failures occurred at the base of the tab ends of the spring. Such failures were due to the constant bending or flexing of the tab ends over the life of the spring. The present invention includes slots 49 and 52, that receive the tab ends and allow the ends to be securely fastened along the entire length of the tabs. The slots prevent any flexing of the tab ends during the life of the spring reducing the amount of strain on the tabs. It has been found that this arrangement creates a longer lasting spring, wherein such springs have been found to exceed 100,000 cycles.

A coupler bushing 62 is connected to the torque tube 58 by a fifth pin 64, the bushing 62 has a bore 66 that receives an output shaft 68. The output shaft 68 protrudes out of the motor 40 through a mounting flange 70 attached to one end of the housing 48. The flange 70 has a bore 72 with a pair of bearings 74 that support the output shaft 68, while allowing the shaft 68 to rotate relative to the housing 48. The mounting flange 70 has a base portion 76, that provides a stop for the springs. The motor 40 may have a dust cover 78 attached to the end of the housing 48, to seal the springs from the environment. A space 79 is provided between the torque tube 58 and the mounting flange 70 to allow the length of the springs to change as the springs are being turned. The motor assembly presented provides a parallel attachment of springs, wherein the total spring constant for the motor, is the sum of the individual spring constants of each spring. Thus the spring constant of the motor can be increased without constructing the springs out of a thicker wire. Because the wire diameter can be the same or smaller, the stress of the springs does not increase for a given force, resulting in a spring assembly with a longer life cycle. In the preferred embodiment the springs are installed in a stretched position, so that the springs do not interfere with each other when the springs are turned. Grease can also be applied to the spring wires to reduce the friction between the springs. The stretching of the springs is preferably done by turning the springs a predetermined number of times, which also provides the motor 40 with a preload.

Figure 5A:
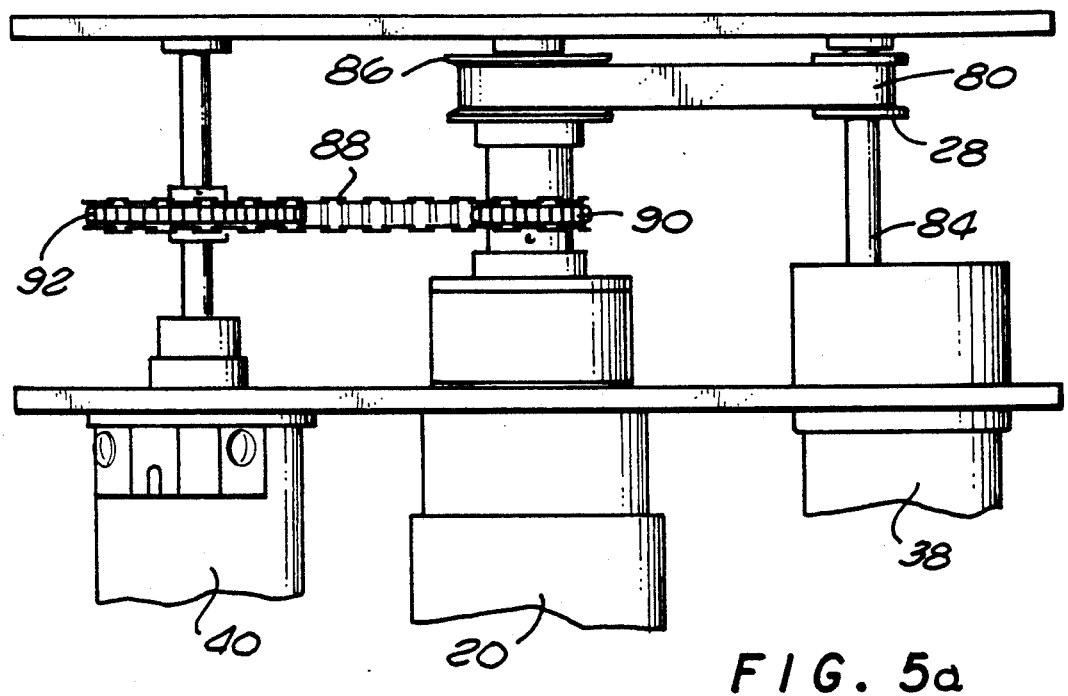
FIG. 5a is an enlarged view of a portion of FIG. 2, showing the actuator connected to the spring motor by a chain link drive and coupled to an electric motor by a belt and pulley assembly.
Figure 5B:
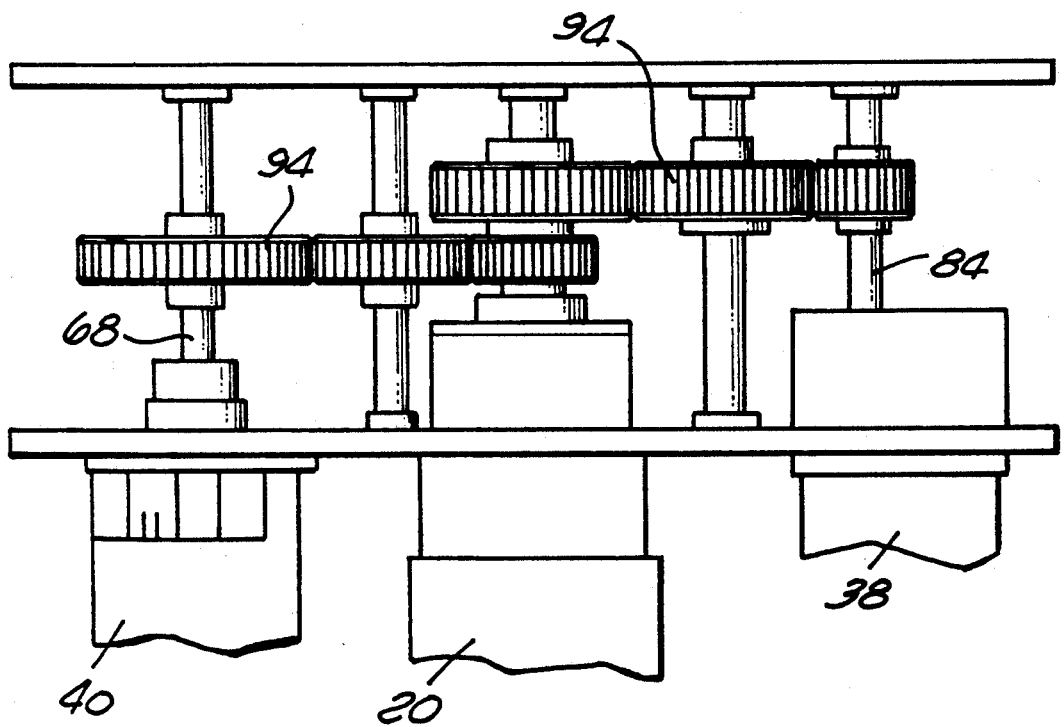
FIG. 5b is an alternate embodiment of FIG. 5a, showing the actuator connected to the spring motor with intermeshing spur gears.

FIGS. 5a and 5b show alternate embodiments of the coupling of the actuator 20 to the motor 40 and electric motor 36. FIG. 5a shows a first belt 80 attached to a first pulley 82 on the output shaft 84 of the electric motor 36 and a second pulley 86 attached to the end of the ball screw 30 of the actuator 20. The first belt 80 couples the electric motor 36 and actuator 20, such that the motor 36 rotates the ball screw 30 in either a first or second direction. A tooth type timing chain belt 88 is attached to a first sprocket 90 on the end of the ball screw 30 and a second sprocket 92 attached to the output shaft 68 of the spring motor 40. The tooth type timing chain belt 88 couples the actuator 20 to the spring motor 40, so that the springs 42, 44 and 46 are turned when the ball screw 30 is rotated. A chain and sprocket drive is preferred because such assemblies have a higher mechanical efficiency. The first belt 80 and pulleys can also be chain and sprocket assemblies. FIG. 5b shows the coupling of the actuator 20 to the spring 40, and electric 36 motors with spur gears 94 attached to the ball screw 30 and output shafts 68. The gears can have a different number of teeth and/or an intermediary gear such the ball screw and spring motor rotate at different revolutions per minute (RPM). Such an arrangement would provide a unit 10, wherein the springs could turn less revolutions than the ball screw. Likewise the pulley diameters could be such that the revolutions of the ball screw are considerably more than the amount of turns by the springs.

In operation, the electric motor 36 rotates the ball screw 30 in a first direction, moving the nut 28 such that the monitor 12 moves from a first position to a second viewing position. The rotation of the ball screw 30 also rotates the output shaft 68 of the spring motor 40 turning the springs in a first direction a predetermined number of turns. The springs thus having a stored potential energy corresponding to the number of turns that the springs were turned during the rotation of the output shaft 68. In the event the electric motor 36 fails or electric power is lost, the electric motor 36 will no longer apply a torque to the actuator. With no countertorque to counter the energy of the spring motor 40, the springs will turn in a second opposite direction. The turning of the springs rotates the output shaft 68 and the ball screw 30, moving the nut 28 such that the monitor 12 is rotated from the second back to the first stowed position. The use of three parallel springs provides a spring constant large enough to pull up heavy monitors with 16" screens or larger. The nesting of the springs creates a compact motor that has a long life because of the lower stresses seen by each spring.

Although a system is described wherein a monitor is retracted if electrical power is lost, it is to be understood that the spring motor 40 can be used as the sole means for retracting the monitor 12. For example, the electric motor 36 of the above described unit can apply a torque to the actuator 20 to move the monitor 12 from the first to the second position. When the monitor 12 is to be stowed, the power to the electric motor 36 can be turned off, whereby the spring motor 40 will automatically rotate the monitor 12 into the first position. Thus the life of the electric motor 36 can be prolonged without having to use the motor 36 to retract the monitor 12.

While certain exemplary embodiments have been described in detail and shown in the accompanying drawings, it is to be understood that such embodiments are merely illustrative of, and not restrictive on the broad invention, and that this invention not be limited to the specific constructions and arrangements shown and described since various other modifications may occur to those ordinarily skilled in the art.

What is claimed is:

1. A display unit for being attached to a structure, said display unit being constructed to stow and expose a video display device to a viewer, said display unit comprising:
    a frame;
    a monitor operatively connected to said frame such that said monitor can move from a first position to a second position relative to said frame, wherein said monitor is stowed within said frame in said first position and said monitor is exposed to a viewer in said second position such that the viewer can view said monitor;
    actuation means operatively connected to said frame and said monitor for moving said monitor from said first position to said second position;
    drive means operatively connected to said actuation means; and,
    a spring motor having at least two parallel torsional springs operatively connected to said actuation means to move said monitor from said second position to said first position.

2. The unit as recited in claim 1, wherein there are there torsional springs, a first spring nested within a second spring which is nested within a third spring, wherein said springs are contained within a housing, such that one end of said springs are coupled to a spring bracket mounted on an outside of said housing and opposite ends of said springs are coupled to a plate at an end of said motor.

3. The unit as recited in claim 1, wherein said spring motor has an output shaft attached to said torsional springs adapted to rotate when said torsional springs turn.

4. The unit as recited in claim 3, further comprising coupling means operatively connected to said actuation means and said output shaft such that said torsional springs turn in a first direction when said actuation means move said monitor from said first to said second position.

5. The unit as recited in claim 4, wherein said coupling means is a chain link drive operatively connected to said output shaft and said ball screw such that said ball screw and said output shaft rotate in conjunction with each other.

6. The unit as recited in claim 4, wherein said actuation means is an actuator having a ball screw that moves said monitor from said first to said second position when said ball screw is rotated in a first direction.

7. The unit as recited in claim 6, wherein said drive means applies a first torque to said actuator to rotate said ball screw in a first direction such that said monitor moves from said first to said second position and said torsional springs are turned a predetermined number of turns in said first direction, said drive means being adapted such that said drive means can cease to apply torque to said actuator, wherein said torsional springs turn said predetermined number of turns in a second opposite direction, rotating said ball screw in said second opposite direction moving said monitor from said second position to said first position.

8. The unit as recited in claim 7, wherein said monitor is pivotally attached to said frame such that said monitor rotates from said first to said second position.

9. The unit as recited in claim 8, wherein said ball screw actuator is pivotally mounted to said frame and said monitor.

10. The unit as recited in claim 7, wherein said drive means is an electric motor operatively connected to said actuator.

11. The unit as recited in claim 10, further comprising at least one air shock pivotally attached to said frame and said monitor to control the velocity of said monitor as said monitor changes positions.

12. A video display unit for being attached to a structure, said display unit being constructed to stow and expose a video display device to a viewer, said display unit comprising:
    a frame;
    a monitor operatively connected to said frame such that said monitor can move from a first position to a second position relative to said frame, wherein said monitor is stowed within said frame in said first position and said monitor is exposed to a viewer in said second position such that the viewer can view said monitor;
    an actuator operatively connected to said frame and said monitor, said actuator having a ball screw that rotates in a first direction such that said monitor moves from said first position to said second position;
    a spring motor operatively connected to said frame having at least two parallel torsional springs attached to an output shaft such that said torsional springs turn in a first direction when said output shaft is turned in said first direction;
    coupling means operatively connected to said ball screw and said output shaft, such that said torsional springs turn a predetermined number of turns in said first direction when said ball screw rotates in said first direction moving said monitor from said first position to said second position; and,
    drive means operatively connected to said actuator adapted to apply a first torque to said actuator to rotate said ball screw in said first direction to move said monitor from said first position to said second position;

whereby when said monitor is in said second position and said drive means does not apply a torque to said ball screw, said torsional springs turn said predetermined number of turns in a second opposite direction rotating said output shaft and said ball screw in said second opposite direction moving said monitor from said second position to said first position, 13. The unit as recited in claim 12, wherein there are three torsional springs, a first spring nested within a second spring which is nested within a third spring, each said torsional spring being attached to said output shaft in parallel.

14. The unit as recited in claim 12, wherein said coupling means is a chain link drive operatively connected to said output shaft and said ball screw such that said ball screw and said output shaft rotate in conjunction with each other.

15. The unit as recited in claim 12, wherein said monitor is pivotally attached to said frame such that said monitor rotates from said first to said second position.

16. The unit as recited in claim 15, wherein said ball screw actuator is pivotally mounted to said frame and said monitor.

17. The unit as recited in claim 12, wherein said drive means is an electric motor.

18. The unit as recited in claim 17, further comprising at least one air shock pivotally attached to said frame and said monitor to control the velocity of said monitor as said monitor changes positions.

19. A video display unit for being attached to a passenger compartment of an airplane such that the display unit stows and exposes a video display device to a viewer, comprising:
a frame;
a monitor pivotally attached to said frame such that said monitor can rotate from a first position to a second position relative to said frame, wherein said monitor is stowed within said frame in said first position and said monitor is exposed to a viewer in said second position such that the viewer can view said monitor;
an actuator pivotally attached to said frame and said monitor, said actuator having a ball screw that rotates in a first direction such that said monitor moves from said first position to said second position;
a spring motor pivotally attached to said frame and said monitor having at least two parallel torsional springs attached to an output shaft such that said torsional springs turn in a first direction when said output shaft is turned in said first direction;
coupling means operatively connected to said ball screw and said output shaft, such that said torsional springs turn a predetermined number of turns in said first direction when said ball screw rotates in said first direction moving said monitor from said first position to said second position; and,
an electric motor operatively connected to said actuator adapted to apply a first torque to said actuator to rotate said ball screw in said first direction to move said monitor from said first position to said second position;
whereby when said monitor is in said second position and said electric motor does not apply a torque to said ball screw, said torsional springs turn said predetermined number of turns in a second opposite direction rotating said output shaft and said ball screw in said second opposite direction moving said monitor from said second position to said first position.

20. The unit as recited in claim 19, wherein there are three torsional springs, a first spring nested within a second spring which is nested within a third spring, each said torsional spring being attached to said output shaft in parallel.

21. The unit as recited in claim 19, wherein said coupling means is a tooth type timing belt operatively connected to said output shaft and said ball screw such that said ball screw and said output shaft rotate in conjunction with each other.

22. The unit as recited in claim 19, wherein said electric motor is adapted to rotate said ball screw in a second opposite direction to move said monitor from said second to said first position, whereby if said electric motor becomes inoperative when said monitor is in said second position said torsional springs turn said predetermined number of turns in said second opposite direction such that said monitor is moved from said second position to said first position.

23. The unit as recited in claim 22, further comprising at least one air shock pivotally attached to said frame and said monitor to control the velocity of said monitor as said monitor changes positions.

24. A method of retracting a video display device into a stowed position of a display unit when electrical power to the display unit is terminated, comprising the steps of:
providing a frame;
pivotally attaching a monitor to said frame such that said monitor can rotate from a first position to a second position relative to said frame, wherein said monitor is stowed within said frame in said first position and said monitor is exposed to a viewer in said second position such that the viewer can view said monitor;
pivotally attaching an actuator to said frame and said monitor, said actuator having a ball screw that rotates in a first direction such that said monitor moves from said first position to said second position; and,
pivotally attaching a spring motor to said frame and said monitor having at least two parallel torsional springs attached to an output shaft such that said torsional springs turn in a first direction when said output shaft is turned in said first direction;
operatively connecting a coupling means to said ball screw and said output shaft, such that said torsional springs turn a predetermined number of turns in said first direction when said ball screw rotates in said first direction moving said monitor from said first position to said second position;
operatively connecting an electric motor to said actuator adapted to apply a first torque to said actuator to rotate said ball screw in said first direction to move said monitor from said first position to said second position, said electric motor being adapted to apply a second torque to said ball screw in a second opposite direction to move said monitor from said second position to said first position;
energizing said electric motor such that said electric motor applies said first torque to said ball screw, wherein said monitor is moved from said first position to said second position; and,
de energizing said electric motor such that there is no torque applied to said ball screw;

whereby said torsional spring turns said predetermined number of turns in said second opposite direction rotating said output shaft and said ball screw in said second direction such that said monitor moves from said second position to said first position.

25. The method as recited in claim 24, wherein there are three torsional springs, a first spring nested within a second spring which is nested within a third spring, each said torsional spring being attached to said output shaft in parallel.

* * * * *

UNITED STATES PATENT AND TRADEMARK OFFICE
CERTIFICATE OF CORRECTION

PATENT NO. : 5,181,771

DATED : January 26, 1993

INVENTOR(S) : Robak et al.

It is certified that error appears in the above-identified patent and that said Letters Patent is hereby corrected as shown below:

In column 5 at line 52 delete "there" and insert --three--

Signed and Sealed this

Thirtieth Day of November, 1999

Attest:

Q. TODD DICKINSON

*Attesting Officer*        *Acting Commissioner of Patents and Trademarks*